US008504583B1

(12) United States Patent
Ke et al.

(10) Patent No.: US 8,504,583 B1
(45) Date of Patent: Aug. 6, 2013

(54) MULTI-DOMAIN RECOMMENDATIONS (75) Inventors: Yan Ke, Redmond, WA (US); Xiaodong Fan, Sammamish, WA (US); Yang Li, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/396,056

(22) Filed: Feb. 14, 2012

(51) Int. Cl.
*G06F 17/30* (2006.01)
(52) U.S. Cl.
USPC ............ 707/767; 707/706; 707/722; 707/758
(58) Field of Classification Search
None
See application file for complete search history.

(56) References Cited

U.S. PATENT DOCUMENTS

| | | | | |
|---|---|---|---|---|
| 6,370,513 | B1* | 4/2002 | Kolawa et al. | 705/7.33 |
| 2002/0010625 | A1* | 1/2002 | Smith et al. | 705/14 |
| 2002/0019763 | A1* | 2/2002 | Linden et al. | 705/10 |
| 2003/0163399 | A1* | 8/2003 | Harper et al. | 705/35 |
| 2008/0250026 | A1* | 10/2008 | Linden et al. | 707/10 |
| 2010/0121777 | A1* | 5/2010 | McGonigal et al. | 705/347 |
| 2011/0035402 | A1* | 2/2011 | Agrawal et al. | 707/769 |
| 2011/0119139 | A1* | 5/2011 | Dean et al. | 705/14.73 |
| 2011/0173216 | A1* | 7/2011 | Newman et al. | 707/765 |
| 2011/0208730 | A1* | 8/2011 | Jiang et al. | 707/727 |
| 2011/0246291 | A1* | 10/2011 | Paul | 705/14.49 |
| 2012/0173324 | A1* | 7/2012 | Vallery et al. | 705/14.25 |

* cited by examiner

*Primary Examiner* — Hung Le
(74) *Attorney, Agent, or Firm* — Shook Hardy & Bacon L.L.P.

(57) ABSTRACT

Methods, computer systems, and computer-readable storage media for generating and presenting multi-domain recommendations to a user viewing a Web page are provided. A topic-of-interest is identified on the Web page being viewed by the user. The topic-of-interest is mapped to an entity ID in a multi-domain recommendation data structure. The multi-domain recommendation data structure is used to identify entities, uniform resource locators, and search queries mapped to the entity ID. Multi-domain recommendations are generated using the entities, uniform resource locators, and search queries; the multi-domain recommendations are presented on the Web page being viewed by the user.

19 Claims, 6 Drawing Sheets

MULTI-DOMAIN RECOMMENDATIONS

BACKGROUND

Recommendations help to enhance a user's search experience on the Internet and are especially helpful when a user does not know a lot about a topic. For instance, the user may not know which search queries yield useful information about the topic or which Web pages are relevant to the topic. Although recommendation systems exist, they are usually domain specific and recommend only one type of information. For example, a recommendation system may only recommend Web pages (often from the same domain), or search queries, or products but not all of these at the same time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to systems, methods, and computer-readable storage media for, among other things, generating and presenting multi-domain recommendations to a user viewing a topic-of-interest on a Web page. The recommendations may encompass other entities (people, locations, reviews, topics, etc.) related to the topic-of-interest, other Web pages related to the topic-of-interest, and search queries related to the topic-of-interest. The result is a comprehensive list of recommendations that help to enrich a user's search experience.

Accordingly, in one aspect, the present invention is directed to one or more computer-readable storage media having embodied thereon computer-executable instructions that, when executed, perform a method of generating and presenting multi-domain recommendations to a user viewing a topic-of-interest on a Web page. The method comprises identifying the topic-of-interest on the Web page currently being viewed by the user and mapping the topic-of-interest to an entity ID in a multi-domain recommendation data structure stored in association with a data store. The multi-domain data structure is used to: (1) identify one or more entities mapped to the entity ID, wherein an entity comprises at least one of a person, object, location, or topic; (2) identify one or more uniform resource locators (URLs) mapped to the entity ID; and (3) identify one or more search queries mapped to the entity ID. The multi-domain recommendations are generated using the entities, the URLs, and the search queries; the multi-domain recommendations are then presented on the Web page currently being viewed by the user.

In another aspect, the present invention is directed to a computerized method carried out by a recommendation engine running on a processor for generating a multi-domain recommendation data structure. The method comprises accessing a data store to identify related uniform resource locators (URLs). Related URLs are identified by: (1) identifying URLs selected by users in response to a search query; (2) identifying URLs frequently visited by users in a search session; and (3) identifying URLs linked to a source URL. Features of the identified URLs are analyzed to determine a relevance of each of the identified URLs, and a page-to-page recommendation data structure is generated by mapping each of the identified URLs to one or more of the related, relevant URLs. The page-to-page recommendation data structure is used to generate a page-to-entity recommendation data structure, an entity-to-entity recommendation data structure, and a search query recommendation data structure. These different data structures are aggregated to generate a multi-domain recommendation data structure.

In yet another aspect, the present invention is directed to a system for generating and providing multi-domain recommendations to a user viewing a topic-of-interest on a Web page. The system comprises a computing device associated with a recommendation engine having one or more processors and one or more computer-readable storage media and a data store coupled with the recommendation engine. The recommendation engine generates a page-to-page recommendation data structure which, in turn, comprises a mapping of at least a first uniform resource locator (URL) to one or more related, relevant URLs. The recommendation engine also generates: (1) a page-to-entity recommendation data structure which comprises a mapping of at least a first entity ID to one or more related, relevant URLs; (2) an entity-to-entity recommendation data structure which comprises a mapping of at least the first entity ID to one or more related entities; and (3) a search query recommendation data structure that comprises a mapping of at least the first entity ID to one or more related search queries. The above data structures are aggregated to generate a multi-domain recommendation data structure. The multi-domain recommendation data structure comprises a mapping of the first entity ID to related, relevant entities, URLs, and search queries.

Continuing with this aspect, the topic-of-interest on the Web page currently being viewed by the user is identified and mapped to the first entity ID. Multi-domain recommendations are generated using the multi-domain recommendation data structure. The multi-domain recommendations comprise entities, URLs, and search queries related to the topic-of-interest. The multi-domain recommendations are automatically presented on the Web page being viewed by the user.

BRIEF DESCRIPTION OF THE DRAWINGS

The present invention is described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to systems, methods, and computer-readable storage media for, among other things, generating and presenting multi-domain recommendations to a user viewing a topic-of-interest on a Web page. The recommendations may encompass other entities (people, locations, reviews, topics, etc.) related to the topic-of-interest, other Web pages related to the topic-of-interest, and search queries related to the topic-of-interest. The result is a comprehensive list of recommendations that help to enrich a user's search experience.

Figure 1:
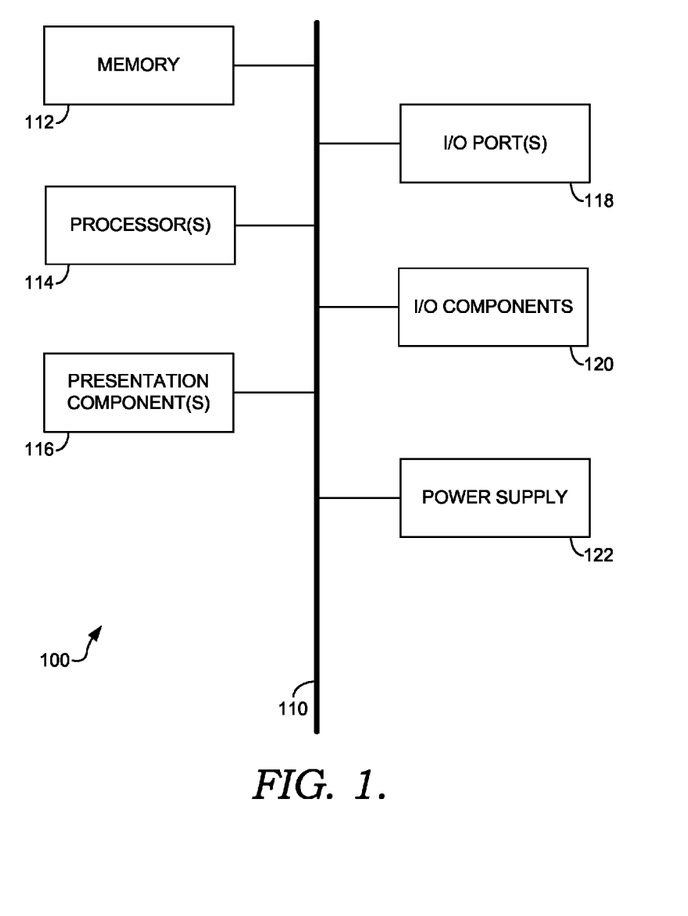
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a set of one or more processes distributed on one or more computers, one or more stand-alone storage devices, a set of one or more other computing or storage devices, a combination of one or more of the above, and the like.

Figure 2:
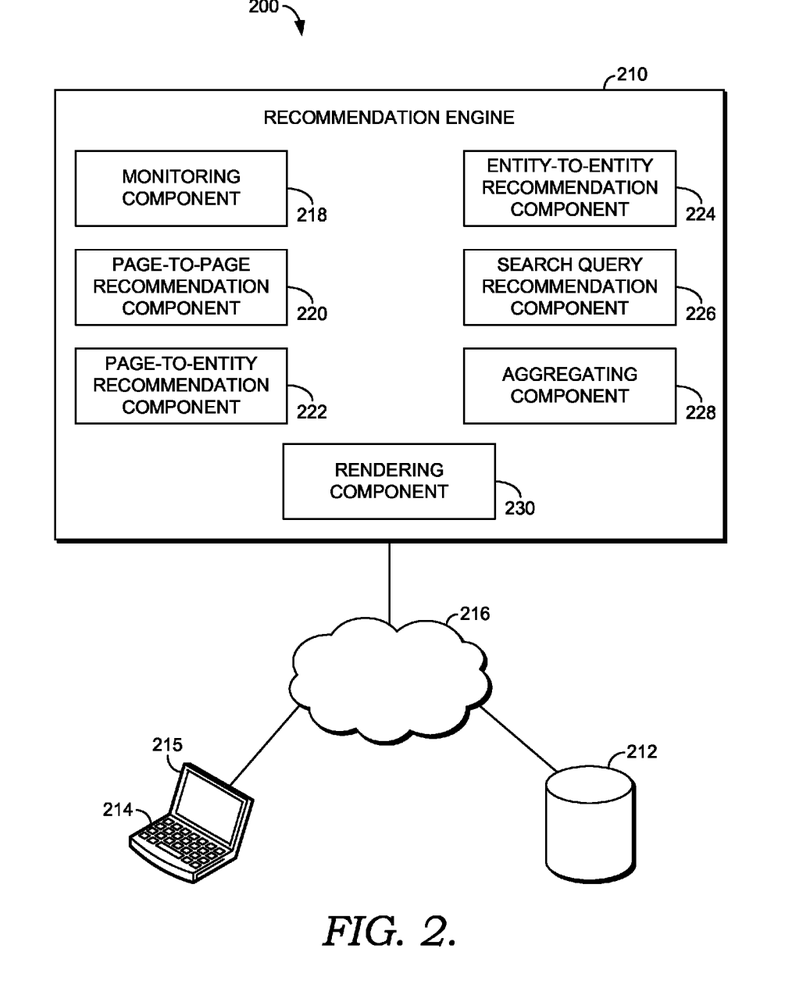
FIG. 2 is a block diagram of an exemplary system for generating and presenting multi-domain recommendations to a user viewing a topic-of-interest on a Web page suitable for use in implementing embodiments of the present invention.

With this as a background and turning to FIG. 2, an exemplary system 200 is depicted for use in generating and presenting multi-domain recommendations to a user. The system 200 is merely an example of one suitable system environment and is not intended to suggest any limitation as to the scope of use or functionality of embodiments of the present invention. Neither should the system 200 be interpreted as having any dependency or requirement related to any single module/component or combination of modules/components illustrated therein.

The system 200 includes a recommendation engine 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the recommendation engine 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the recommendation engine 210 might reside on a server, a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 212 is configured to store information for use by, for example, the recommendation engine 210. The information stored in association with the data store 212 is configured to be searchable for one or more items of information stored in association therewith. The information stored in association with the data store 212 may comprise general information used by the recommendation engine 210. For example, the data store 212 may store information concerning recorded search behavior (query logs, rating logs, browser or search logs, query click logs, related search lists, etc.) of users in general, and a log of a particular user's tracked interactions with the recommendation engine 210. Query click logs provide information on Web pages selected by users in response to a search query, while browser/search logs provide information on Web pages viewed by users during a search session and how frequently any one Web page is visited by users. Additionally, rating logs indicate an importance or ranking of a Web page based on, for example, various rating algorithms known in the art.

Additionally, the data store 212 stores information concerning Web page hyperlink data. Web page hyperlink data may include, for example, information about the number and identity of uniform resource locators (URLs) that are linked through hyperlinks to a source URL (which may also be known as an index page).

The data store 212 also stores information concerning entities and entity IDs. As used throughout this application, the term entity is meant to encompass people, objects, topics, articles, products, locations, reviews, businesses, and the like. Each entity is assigned an entity ID which may be an alphanumeric string. In one aspect, an entity name and an entity ID may be associated with a canonical set of Web pages having the same domain name. For instance, the set of Web pages associated with the domain name "cnn.com" may represent the business entity "CNN" and be assigned an entity ID. An entity ID may also identify an author of a set of Web pages (blogs, posts, reviews, etc.). In one aspect, the associations between entity names and canonical sets of Web pages may be generated via manual labeling or content curation.

The data store 212 is also configured to store a number of data structures generated and used by, for example, the recommendation engine 210. The data structures may include a page-to-page recommendation data structure, a page-to-entity recommendation data structure, an entity-to-entity recommendation data structure, and a search query recommendation data structure. Further, these data structures may be aggregated into a multi-domain recommendation data structure which is also stored in association with the data store 212. These different data structures will be explored in greater depth below.

The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the recommendation engine 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof. As shown, the end-user computing device 214 includes a display screen 215. The display screen 215 is configured to present information, including Web pages and recommendations to the user of the end-user computing device 214.

The system 200 is merely exemplary. While the recommendation engine 210 is illustrated as a single unit, it will be appreciated that the recommendation engine 210 is scalable. For example, the recommendation engine 210 may in actuality include a plurality of computing devices in communication with one another. Moreover, the data store 212, or portions thereof, may be included within, for instance, the recommendation engine 210 as a computer-storage medium. The single unit depictions are meant for clarity, not to limit the scope of embodiments in any form.

As shown in FIG. 2, the recommendation engine 210 comprises a monitoring component 218, a page-to-page recommendation component 220, a page-to-entity recommendation component 224, an entity-to-entity recommendation component 224, a search query recommendation component 226, an aggregating component 228, and a rendering component 230. In some embodiments, one or more of the components 218, 220, 222, 224, 226, 228, and 230 may be implemented as stand-alone applications. In other embodiments, one or more of the components 218, 220, 222, 224, 226, 228, and 230 may be integrated directly into the operating system of a computing device such as the computing device 100 of FIG. 1. It will be understood that the components 218, 220, 222, 224, 226, 228, and 230 illustrated in FIG. 2 are exemplary in nature and in number and should not be construed as limiting. Any number of components may be employed to achieve the desired functionality within the scope of embodiments hereof.

The monitoring component 218 of FIG. 2 is configured to monitor Web pages being viewed by a user during a search session and identify topics-of-interest on those Web pages. As used throughout this application, the term "search session" is meant to encompass any user activity related to the World Wide Web (the "Web"). For example, it may include a user visiting a search engine such as Bing® and entering a search query, receiving a set of results, and selecting one of the results in order to access a Web page. As well it may include a user inputting a uniform resource locator (URL) in a Web browser, such as Internet Explorer®, and accessing a Web page. Additionally, it may include a user selecting a hyperlink while visiting a Web page in order to access another Web page or navigating between different Web pages. These examples are provided for illustrative purposes only and are not meant to be limiting in any way.

A topic-of-interest on a Web page may be identified by the monitoring component 218 by determining what product or entity is being presented on the Web page. For instance, the user may be viewing a Web page with a uniform resource locator (URL) of, for example, http://www.cnet.com/xbox-360. The monitoring component 218 utilizes the data store 212 to determine that the entity "Xbox 360" is associated with a canonical set of Web pages having a URL of, for example, "http://www.xbox.com/en-US/xbox-360." Further, the monitoring component 218 utilizes the page-to-page recommendation data structure stored in association with the data store 212 to determine that the URL, "http://www.cnet.com/xbox-360" is closely related to the URL, "http://www.xbox.com/en-US/xbox-360." The monitoring component 218 may then infer that the URL, "http://www.cnet.com/xbox-360" is about the topic-of-interest Xbox 360; the topic-of-interest being substantially equivalent to the entity.

In another example, the monitoring component 218 may extract textual information associated with the Web page and determine that some of the textual information includes the Web page author's name. The topic-of-interest identified in this case is the author's name. Multiple topics-of-interest may be extracted from a single Web page being viewed by the user. Topics-of-interest identified from a Web page that has a review of the Xbox 360 may include the product (Xbox 360), the review, as well as the author of the review.

Once the monitoring component 218 has identified one or more topics-of-interest on a Web page, the monitoring component 218 is further configured to map the topic-of-interest to an entity ID in a multi-domain recommendation data structure stored in association with, for example, the data store 212. The multi-domain recommendation data structure comprises a mapping between entity IDs and related, relevant entities, URLs, and search queries. The multi-domain recommendation data structure is generated offline by the recommendation engine 210 utilizing the components 220, 222, 224, 226, and 228 as outlined below.

The page-to-page recommendation component 220 is configured to generate a page-to-page recommendation data structure. This data structure, in turn, is used to generate additional data structures that are ultimately aggregated to create the multi-domain recommendation data structure. The page-to-page recommendation component 220 generates the page-to-page data structure by accessing the data store 212 and identifying related URLs using, for example, query click logs, Web page hyperlink data, and browser/search log data. Related URLs may be associated with the same domain name or different domain names.

URLs may be related if they are selected by users in response to a search query. This data is contained in, for example, the query click logs stored in association with the data store 212. For example, a user may input a search query "Xbox 360," and have a set of search results returned. The user then selects an Amazon® Web page that has product and pricing information, and the user also selects a blog post that has reviews about the Xbox 360. The page-to-page recommendation component 220 identifies these two URLs (the Amazon URL and the blog post URL) as related URLs.

Related URLs may also be identified by the page-to-page recommendation component 220 using browser/search logs to determine URLs visited by a user during a search session. For instance, the user may be viewing a Web page associated with a restaurant and navigate to Web pages dealing with restaurant reviews, directions, other restaurants with similar cuisines, and the like. The page-to-page recommendation component 220 identifies these different URLs or Web pages as related URLs that are part of the same URL stream.

Further, the page-to-page recommendation component 220 identifies related URLs by accessing Web page hyperlink data. As mentioned, Web page hyperlink data indicates the identity and number of URLs linked to a source URL. Those Web pages that link to the same source URL are identified as related. For example, a source URL may be a tourist Website for New York City. Web pages for the Empire State building and Grand Central Station may be linked to this source URL and identified by the page-to-page recommendation component 220 as related.

Next, the page-to-page recommendation component 220 analyzes features of the identified URLs to determine their relevance or importance. Relevance may be determined by, for example, examining the number of incoming links or inlinks to a given URL, determining the number of times a URL is visited, and/or identifying a page rank of a URL using rating logs or ranking algorithms. Other methods known in the art for determining relevance are also contemplated. URLs determined to be relevant are used to construct the page-to-page data structure. The page-to-page recommendation component 220 generates the page-to-page data structure by mapping each of the identified URLs to one or more of the identified related, relevant URLs. Additionally, the page-to-page recommendation component 220 stores the page-to-page data structure in association with the data store 212.

The page-to-entity recommendation component 222 is configured to generate a page-to-entity recommendation data structure utilizing information stored in association with the data store including the page-to-page data structure. The page-to-entity recommendation component 222 accesses entity ID data and identifies a set of canonical Web pages associated with an entity ID. As mentioned above for example, Web pages with the domain name "cnn.com" represent the set of canonical Web pages associated with the business entity "CNN." The page-to-entity recommendation component 222 then utilizes the page-to-page recommendation data structure to identify a first group of URLs that are related to the set of canonical Web pages. As well, the page-to-entity recommendation component 222 utilizes the page-to-page data structure to identify additional URLs that are related to the first group of URLs, and so on. In this way, the original entity is mapped to any number of related, relevant URLs. The page-to-entity recommendation component 222 may utilize a stopping algorithm to determine a satisfactory number of URLs that are sufficiently related to the entity ID. The page-to-entity recommendation component 222 then generates the page-to-entity data structure by mapping the entity IDs to the related, relevant URLs and stores the data structure in association with the data store 212.

In one aspect, the page-to-entity recommendation component 222 is configured to identify blogs, posts, reviews, etc. written by an author. The URLs corresponding to the blogs, posts, and reviews are mapped to the author's entity ID in the data store thus generating a page-to-author recommendation data structure. Further, the page-to-entity recommendation component 222 utilizes the page-to-page data structure to determine additional URLs related to the blogs, posts, and reviews. The resulting page-to-author data structure is stored in association with the data store 212.

The entity-to-entity recommendation component 224 is configured to generate an entity-to-entity data structure using information stored in association with the data store 212 including the page-to-page data structure and the page-to-entity data structure. Utilizing the page-to-entity data structure, the entity-to-entity recommendation component 224 determines a first set of relevant URLs that are related to a first entity ID. Next, using the page-to-page data structure, the entity-to-entity recommendation component 224 determines a second set of relevant URLs that is related to the first set of URLs. Again using the page-to-entity data structure, the entity-to-entity recommendation component 224 determines a set of entities related to the second set of URLs. The entity-to-entity recommendation component 224 then generates the entity-to-entity recommendation data structure by mapping the first entity ID to the set of entities; the entity-to-entity data structure is stored in association with the data store 212.

The search query recommendation component 226 is configured to generate a search query recommendation data structure utilizing information stored in association with the data store 212. The search query recommendation component 226 utilizes, for example, the query click logs to identify a first URL that is frequently selected in response to a search query. Using the page-to-page data structure, the search query recommendation component 226 identifies relevant URLs that are related to the first URL. Again using the query click logs, the search query recommendation component 226 next identifies search queries frequently associated with the relevant URLs, and using the page-to-entity data structure, the search query recommendation component 226 identifies entities mapped to the relevant URLs. The search query recommendation component 226 then generates the search query recommendation data structure by mapping the identified search queries to the entities. The search query recommendation data structure is stored in association with the data store 212.

The aggregating component 228 is configured to aggregate the data from the page-to-page data structure, the page-to-entity data structure, the entity-to-entity data structure, and the search query recommendation data structure to generate a multi-domain recommendation data structure. The multi-domain data structure comprises mappings between entity IDs and: (1) other relevant, related entities; (2) relevant, related URLs; and (3) relevant, related search queries.

Figure 3:
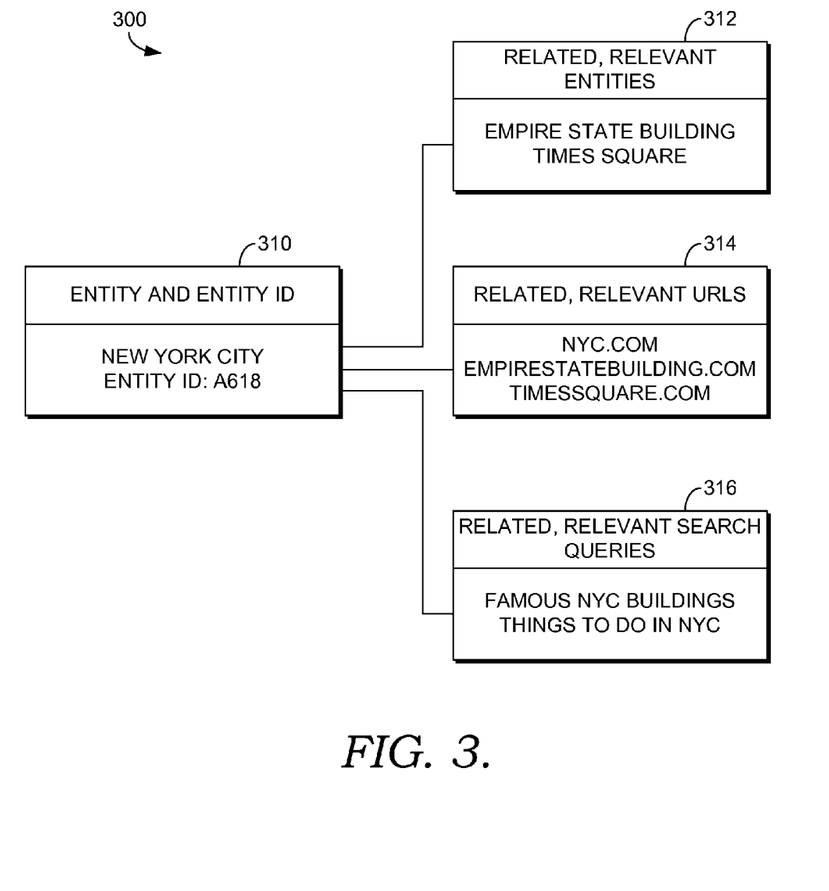
FIG. 3 is an exemplary data structure illustrating a mapping between an entity ID and related, relevant entities, uniform resource locators, and search queries in accordance with an embodiment of the present invention.

FIG. 3 illustrates an excerpt 300 from an exemplary multi-domain recommendation data structure. The excerpted data structure 300 is illustrative and exemplary in nature and is not meant to be limiting in any way. The purpose of FIG. 3 is to portray concepts and relationships between various data elements and not the actual arrangement of data in a data store.

As shown in table 310, a first entity (New York City) and its associated entity ID (A618) are depicted. The first entity is related to table 312, table 314, and table 316. For instance, the table 312 illustrates that the entity "New York City" is related to other entities such as the Empire State Building and Times Square. Further, the table 314 illustrates that the entity "New York City" is also related to URLs such as "NYC.com," "Empirestatebuilding.com," and "Timessquare.com." Additionally, the table 316 illustrates that the entity "New York City" is related to search queries such as "Famous NYC buildings," and "Things to do in NYC."

Turning back to FIG. 2, the rendering component 230 is configured to determine multi-domain recommendations using the multi-domain data structure. As mentioned above, the monitoring component 218 is configured to identify a topic-of-interest on a Web page being viewed by a user and to map the topic-of-interest to an entity ID in the multi-domain data structure. The rendering component 230 identifies other entities, URLs, and search queries related to the entity ID (and, in turn, related to the topic-of-interest) by utilizing the multi-domain data structure.

The rendering component 230 is further configured to present these recommendations on the Web page being viewed by the user. The multi-domain recommendations may be presented as a tool bar or user interface along a top, bottom, or side of the Web page currently being viewed. Additionally, the recommendations may be presented as a pop-up window that overlays a portion of the content of the Web page being viewed. These are only two examples of ways to present the multi-domain recommendation; other ways of presenting information in association with Web pages are contemplated to be within the scope of the invention.

The multi-domain recommendations are dynamically generated upon identifying a topic-of-interest on a Web page. As used throughout this application, the term "dynamically" means occurring in near real-time. In one aspect, the multi-domain recommendations are presented automatically and without user intervention upon identifying a topic-of-interest on a Web page. In another aspect, the recommendations are presented upon receiving a user-initiated selection request. For instance, the user may select an option located on the browser's tool bar to initiate a request for multi-domain recommendations.

The rendering component 230 may be configured to present relevant recommendations from each category of recommendations (entities, Web pages, and search queries). Relevance may be determined through different methods known in the art (for example, ranking algorithms based on frequency of use). For example, the rendering component may present the two highest-ranking recommendations from each category. In another aspect, the rendering component may be configured to present relevant recommendations regardless of whether the recommendation is an entity, search query, or URL. Thus, if the top five recommendations, for example, are all URLs, the URL recommendations would be presented. Any and all such variations are within the scope of the invention.

Each of the multi-domain recommendations may be associated with a selectable option. For instance, a selectable button may be associated with the recommendation, or the user may be able to select the recommendation itself. The rendering component 230 is furthered configured to receive a selection of a multi-domain recommendation and navigate the user to a Web page having content associated with the selected recommendation. For example, if a recommendation involves an entity, selection of the entity navigates the user to one or more Web pages having content associated with the entity. If a recommendation is a URL, selection of the recommendation navigates the user to the Web page corresponding to the URL. As well, if a recommendation is a search query, selection of the search query navigates the user to one or more search engine pages having search results corresponding to the search query.

Figure 4:
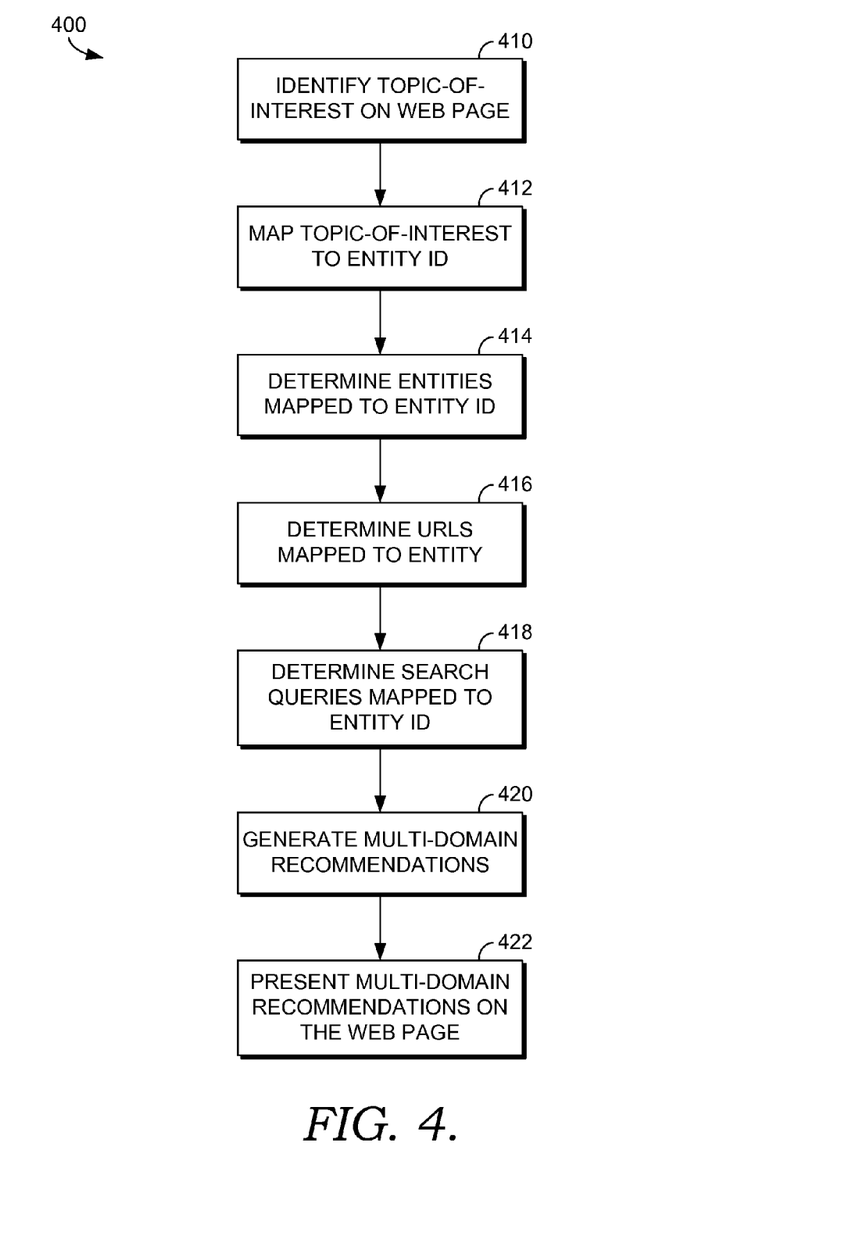
FIG. 4 is a flow diagram that illustrates an exemplary method of generating and presenting multi-domain recommendations to a user viewing a topic-of-interest on a Web page in accordance with an embodiment of the present invention.

Turning now to FIG. 4, a flow diagram is depicted that illustrates an exemplary method 400 of generating and presenting multi-domain recommendations to a user viewing a topic-of-interest on a Web page. At a step 410, a topic-of-interest is identified on the Web page. This may be done by a monitoring component such as, for example, the monitoring component 218 of FIG. 2. The topic-of-interest may be a product, a review, a blog post, an author, a location, a person, and the like. With respect to identifying an author of a Web page, textual elements associated with the Web page are extracted by the monitoring component and are analyzed to identify the author's name.

At a step 412, the topic-of-interest is mapped to an entity ID where the entity ID is part of a multi-domain recommendation data structure stored in association with a data store such as the data store 212 of FIG. 2. The mapping is carried out by the monitoring component. By way of example, if the topic-of-interest is identified as the location "New York City," it is mapped to the entity ID associated with the entity "New York City." In one aspect, the entity ID is an alphanumeric string of varying length.

At a step 414, entities mapped to the entity ID are determined by a rendering component such as, for example, the rendering component 230 of FIG. 2. Entities include such things as people, locations, topics, articles, reviews, businesses, and the like. The rendering component determines entities mapped to the entity ID by using the multi-domain recommendation data structure. The multi-domain recommendation data structure comprises a mapping between one or more entity IDs and relevant, related entities, URLs, and search queries. When the entity ID is associated with an author, entities mapped to the author may include other topics addressed by the author.

At a step 416, URLs mapped to the entity ID are also determined by, for example, the rendering component. Again, this is done by accessing the multi-domain recommendation data structure. When the entity ID is associated with an author of a Web page (blog, post, review, etc.), URLs associated with the entity ID may include other blogs, posts, reviews, and/or articles authored by the author, or, additionally, blogs, posts, reviews, and/or articles authored by a different author but addressing the same topic.

At a step 418, search queries mapped to the entity ID are determined by the rendering component using the multi-domain recommendation data structure. The search queries are related to the topic-of-interest and lead the user to search results that may be of interest.

At a step 420, the different recommendations are aggregated to generate a set of multi-domain recommendations. This is also done by the rendering component 230. In one aspect, the multi-domain recommendations may encompass relevant recommendations drawn from each category of recommendations (entity, URL, and search query). Thus, for example, the top two recommendations may be presented from each type of recommendation. Different methods know in the art may be used to determine which recommendations to present. For instance, frequency of use may determine relevance. In another aspect of the invention, the top-ranked recommendations are presented regardless of the type of recommendation. Any and all such aspects are within the scope of the invention.

At a step 422, the multi-domain recommendations are presented on the Web page currently being viewed by the user. Again, this may be done by the rendering component. The recommendations may be presented on a tool bar or user interface located on a top, bottom or side of the Web page being viewed. Alternatively, the recommendations may be presented as a pop-up window overlaying part of the content of the Web page being viewed. In one aspect, the recommendations are automatically presented upon identifying a topic-of-interest on the Web page. In another aspect, the recommendations are presented upon receiving a user-initiated selection request for recommendations. Each of the multi-domain recommendations may be associated with a selectable option. When the user selects the option, the user is directed to one or more Web pages having content associated with the selected recommendation.

Figure 5:
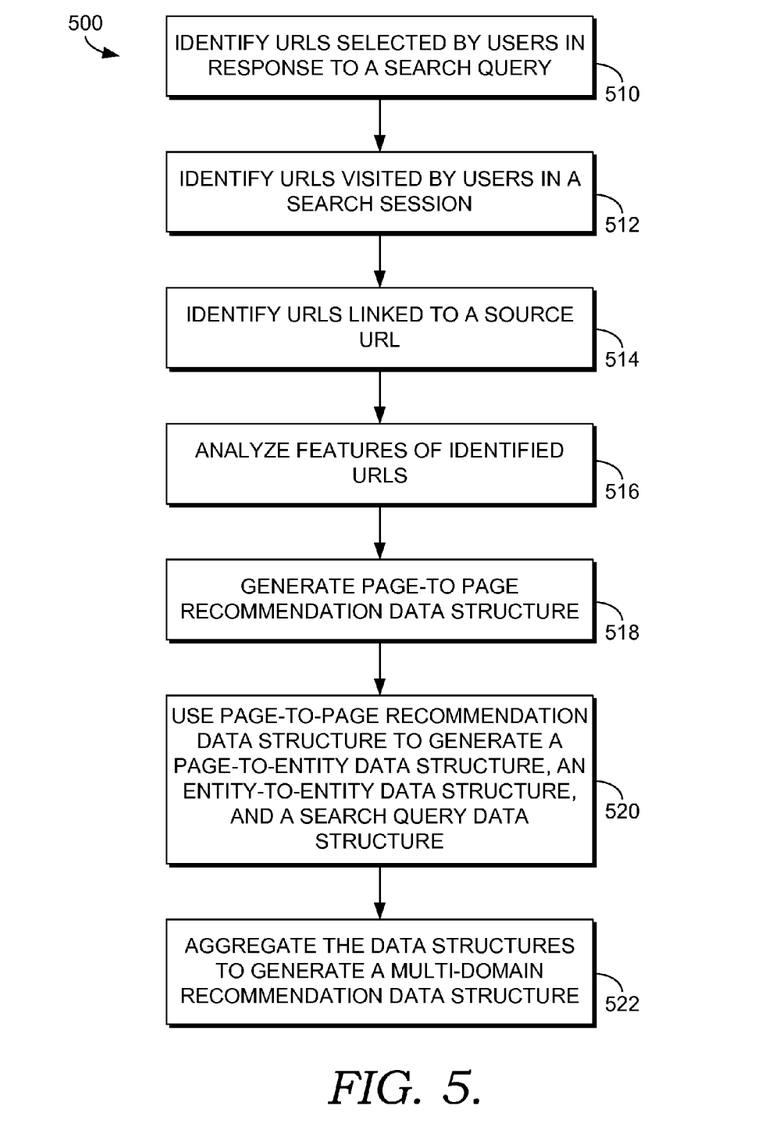
FIG. 5 is a flow diagram that illustrates an exemplary method of generating a multi-domain recommendation data structure in accordance with an embodiment of the present invention.

Turning now to FIG. 5, a flow diagram is depicted that illustrates an exemplary method 500 of generating a multi-domain recommendation data structure. At a step 510, URLs frequently selected by users in response to a search query are identified by, for example, a page-to-page recommendation component (such as the page-to-page recommendation component 220 of FIG. 2). This is done by, for example, accessing query click logs stored in association with a data store such as the data store 212 of FIG. 2. URLs selected by users in response to a search query are identified as related to each other.

At a step 512, related URLs are also identified by the page-to-page recommendation component by determining URLs frequently visited by users in a single search session. Those URLs that are part of the same URL stream are considered related to each other. This is done by accessing browser or search session logs stored in association with the data store.

At a step 514, related URLs are identified by accessing, for example, Web page hyperlink data stored in association with the data store and identifying URLs linked to a source URL. At a step 518, features of the identified URLs are analyzed to determine relevance. Features linked to relevance may include, for example, a number of inlinks to each one of the identified URLs, a frequency visited for each one of the identified URLs, a page rank of each one of the identified URLs, and other such relevance indicators known in the art.

At a step 518, a page-to-page recommendation data structure is generated by the page-to-page recommendation component. The page-to-page data structure is generated by mapping each one of the identified URLs to relevant, related URLs. The page-to-page data structure is stored in association with the data store.

At a step 520, the page-to-page data structure is used to generate a page-to-entity data structure, an entity-to-entity data structure, and a search query data structure. For instance, the relationships between related URLs in the page-to-page data structure can be extended by using information stored in association with the data store (query click logs, entity ID data, browser and search logs, and search query data) to define relationships between entities and URLs, entities and entities, and entities and search queries. This process was explained above with respect to FIG. 2. At a step 522, the different data structures are aggregated to generate the multi-domain recommendation data structure. The multi-domain recommendation data structure defines relationships between, for example, entity IDs and related, relevant entities, URLs, and search queries.

Figure 6:
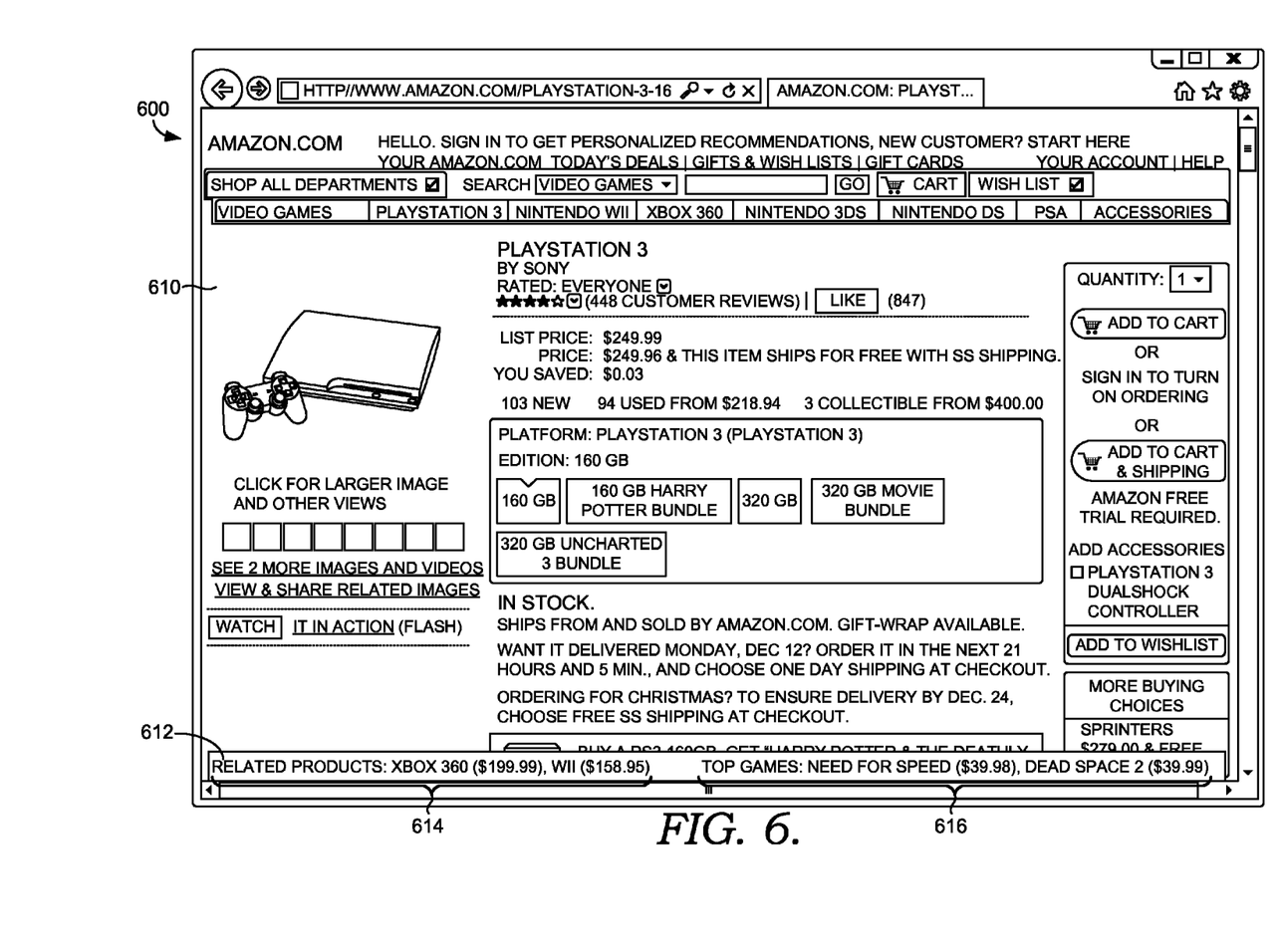
FIG. 6 is an exemplary user interface illustrating the presentation of multi-domain recommendations on a Web page currently being viewed by a user in accordance with an embodiment of the present invention.

Turning to FIG. 6, an exemplary user interface (UI) 600 is depicted illustrating the presentation of multi-domain recommendations on a Web page 610 being viewed by a user. The UI 600 includes the Web page 610 being viewed by the user along with a set of multi-domain recommendations 612. The Web page 610 depicts a topic-of-interest (PlayStation 3®); the multi-domain recommendations 612 are related to the topic-of-interest.

The multi-domain recommendations 612 are presented on a tool bar located along the bottom portion of the Web page 610. The multi-domain recommendations 612 may also be presented as a tool bar located along the top or sides of the Web page 610, or as a pop-up window overlaying a portion of the content of the Web page 610.

In this example, the multi-domain recommendations 612 include "related products" 614 and "top games" 616. Although the recommendations 614 and 616 are entity recommendations, other types of recommendations are contemplated. For example, URLs corresponding to reviews may be provided, and/or search queries related to other types of gaming systems may be provided. Each of the recommendations 614 and 616 is selectable. Upon selection, the user is directed to a Web page having content associated with the recommendation 614 or 616. For instance, if the user selects the recommendation "Need for Speed," the user would be presented with a Web page providing product and ordering information for this game.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-readable storage media having embodied thereon computer-executable instructions that, when executed, perform a method of generating and presenting multi-domain recommendations to a user viewing a topic-of-interest on a Web page, the method comprising:
   identifying the topic-of-interest on the Web page being viewed by the user;
   mapping the topic-of-interest to an entity ID in a multi-domain recommendation data structure stored in association with a data store;
   using the multi-domain recommendation data structure:
      (1) determining one or more entities mapped to the entity ID, wherein an entity comprises at least one of person, object, location, or topic;
      (2) determining one or more uniform resource locators (URLs) mapped to the entity ID using a page-to-entity recommendation data structure generated by associating a set of canonical Web pages with the entity ID, associating a first set of relevant URLs to the set of canonical Web pages, associating a second set of relevant URLs to the first set of relevant URLs, and mapping the entity ID to the first set of relevant URLs and the second set of relevant URLs; and
      (3) determining one or more search queries mapped to the entity ID;
   generating a set of multi-domain recommendations related to the topic-of-interest, the set of multi-domain recommendations comprising at least a portion of the one or more entities, the one or more URLs, and the one or more search queries; and
   presenting the set of multi-domain recommendations on the Web page being viewed by the user.

2. The media of claim 1, wherein the multi-domain recommendation data structure comprises a mapping between one or more entity IDs and relevant, related entities, URLs, and search queries.

3. The media of claim 1, wherein identifying the topic-of-interest on the Web page currently being viewed by the user includes identifying an author of the Web page.

4. The media of claim 3, wherein identifying the author of the Web page comprises:
   extracting textual information associated with the Web page; and
   determining that at least a portion of the textual information comprises the author's name.

5. The media of claim 4, wherein determining the one or more entities mapped to the entity ID comprises determining other Web pages authored by the author.

6. The media of claim 1, wherein the entity ID represents at least one of a set of canonical Web pages or a Web page author.

7. The media of claim 6, wherein the set of canonical Web pages comprises one or more Web pages associated with a single domain name.

8. The media of claim 1, wherein presenting the set of multi-domain recommendations on the Web page currently being viewed by the user comprises presenting the set of multi-domain recommendations on a tool bar or a pop-up window.

9. The media of claim 1, wherein the set of multi-domain recommendations is presented upon receiving a user-initiated selection request.

10. The media of claim 1, wherein each recommendation within the set of multi-domain recommendations is associated with a selectable option.

11. The media of claim 10, further comprising:
   receiving a selection of at least one recommendation of the set of multi-domain recommendations; and
   navigating the user to one or more Web pages having content associated with the at least one recommendation of the set of multi-domain recommendations.

12. A computerized method carried out by a recommendation engine running on a processor for generating a multi-domain recommendation data structure, the method comprising:
   accessing a data store to identify related uniform resource locators (URLs), wherein related URLs are identified by:
      (1) identifying URLs frequently selected by users in response to a search query,
      (2) identifying URLs frequently visited by users in a browser session, and
      (3) identifying URLs linked to a source URL,
   analyzing features of the identified URLs to determine a relevance of each of the identified URLs;
   generating a page-to-page recommendation data structure by mapping each of the identified URLs to one or more of the related, relevant URLs; and
   using the page-to-page recommendation data structure to generate a page-to-entity recommendation data structure, an entity-to-entity recommendation data structure, and a search query recommendation data structure, wherein using the page-to-page recommendation data structure to generate the page-to-entity recommendation data structure comprises:
(1) identifying a set of canonical Web pages associated with an entity ID;
(2) identifying a first set of relevant URLs mapped to the set of canonical Web pages using the page-to-page recommendation data structure;
(3) identifying a second set of relevant URLs mapped to the first set of relevant URLs using the page-to-page recommendation data structure; and
(4) generating the page-to-entity recommendation data structure by mapping the entity ID to the first set of relevant URLs and the second set of relevant URLs.

13. The method of claim 12, wherein the data store comprises query click logs, Web page hyperlink data, search log data, and entity ID data.

14. The method of claim 13, wherein the entity ID data comprises sets of canonical Web pages, each associated with an entity ID.

15. The method of claim 13, further comprising:
aggregating the page-to-page recommendation data structure, the page-to-entity recommendation data structure, the entity-to-entity recommendation data structure, and the search query recommendation data structure to generate the multi-domain recommendation data structure.

16. The method of claim 12, wherein analyzing features of the identified URLs to determine a relevance of the identified URLs comprises at least one of:
(1) determining a number of inlinks to each one of the identified URLs,
(2) determining a frequency visited for each one of the identified URLs, or
(3) determining a page rank of each one of the identified URLs.

17. The method of claim 12, wherein using the page-to-page recommendation data structure to generate the entity-to-entity recommendation data structure comprises:
identifying a first set of relevant URLs mapped to an entity ID using the page-to-entity recommendation data structure;
identifying a second set of relevant URLs mapped to the first set of URLs using the page-to-page recommendation data structure;
identifying one or more entity IDs mapped to the second set of relevant URLs using the page-to-entity recommendation data structure; and
generating the entity-to-entity recommendation data structure by mapping the entity ID to the one or more entity IDs.

18. The method of claim 17, wherein using the page-to-page recommendation data structure to generate the search query recommendation data structure comprises:
using the query click logs, identifying a first URL frequently selected in response to a search query;
using the page-to-page recommendation data structure, identifying relevant URLs mapped to the first URL;
using the query click logs, identifying search queries frequently associated with the relevant URLs;
using the page-to-entity recommendation data structure, identifying entity IDs mapped to the relevant URLs; and
generating the search query recommendation data structure by mapping the search queries to the entity IDs.

19. A system for generating and presenting multi-domain recommendations to a user viewing a topic-of-interest on a Web page, the system comprising:
a computing device associated with a recommendation engine having one or more processors and one or more computer-readable storage media; and
a data store coupled with the recommendation engine,
wherein the recommendation engine:
generates a page-to-page recommendation data structure, the page-to-page recommendation data structure comprising a mapping of at least a first uniform resource locator (URLs) to one or more related, relevant URLs;
generates a page-to-entity recommendation data structure, wherein generating the page-to-entity recommendation data structure comprises: 1) identifying a set of canonical Web pages associated with an entity ID, 2) identifying a first set of relevant URLs mapped to the set of canonical Web pages using the page-to-page recommendation data structure, 3) identifying a second set of relevant URLs mapped to the first set of relevant URLs using the page-to-page recommendation data structure, and 4) mapping the entity ID to the first set of relevant URLs and the second set of relevant URLs;
generates an entity-to-entity recommendation data structure, the entity-to-entity recommendation data structure comprising a mapping of the at least the first entity ID to one or more related entities;
generates a search query recommendation data structure, the search query recommendation data structure comprising a mapping of the at least the first entity ID to one or more related search queries;
aggregates the page-to-page recommendation data structure, the page-to-entity recommendation data structure, the entity-to-entity recommendation data structure, and the search query recommendation data structure to generate a multi-domain recommendation data structure, the multi-domain recommendation data structure comprising at least a mapping of the first entity ID to related, relevant entities, the first entity ID to related, relevant URLs, and the first entity ID to related, relevant search queries;
identifies the topic-of-interest on the Web page currently being viewed by the user;
maps the topic-of-interest to the first entity ID;
generates the multi-domain recommendations using the multi-domain recommendation data structure, the multi-domain recommendations comprising entities related to the topic-of-interest, URLs related to the topic-of-interest, and search queries related to the topic-of-interest; and
automatically presents the multi-domain recommendations on the Web page being viewed by the user.

* * * * *